Figure 1:
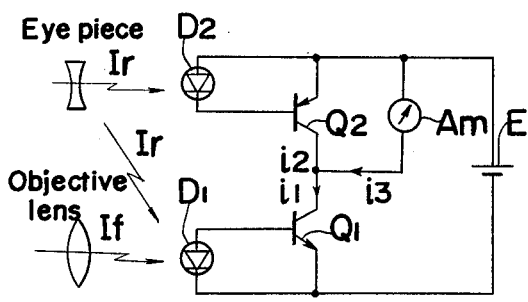

United States Patent

Beppu

[11] 3,975,746
[45] Aug. 17, 1976

[54] AUTOMATIC EXPOSURE CONTROL CIRCUIT FOR A SINGLE LENS REFLEX CAMERA OF TTL LIGHT MEASURING TYPE

[75] Inventor: Norio Beppu, Sennan, Japan

[73] Assignee: Minolta Camera Kabushiki Kaisha, Osaka, Japan

[22] Filed: Feb. 19, 1975

[21] Appl. No.: 550,908

[30] Foreign Application Priority Data
Feb. 25, 1974 Japan .............................. 49-22640

[52] U.S. Cl. ............................. 354/51; 354/24; 354/31; 354/60 R
[51] Int. Cl.² ......................................... G03B 7/08
[58] Field of Search .............. 354/24, 31, 50, 51, 354/60 R

[56] References Cited
UNITED STATES PATENTS

| | | |
|---|---|---|
| 3,679,905 | 7/1972 | Watanabe .......................... 354/50 X |
| 3,815,148 | 6/1974 | Ikeda et al. ........................... 354/24 |
| 3,836,921 | 9/1974 | Mori .................................... 354/31 |
| 3,863,263 | 1/1975 | Itagaki ............................. 354/51 X |
| 3,866,240 | 2/1975 | Tsujimoto ............................. 354/24 |

*Primary Examiner*—L. T. Hix
*Assistant Examiner*—James LaBarre
*Attorney, Agent, or Firm*—Wenderoth, Lind & Ponack

[57] ABSTRACT

An automatic exposure control circuit for a single lens reflex camera of the TTL light measuring type in which light entering through an eyepiece, in addition to light entering through an objective lens, is compensated for accurate exposures of the film. The automatic exposure control circuit of the invention is characterized in that, even if the characteristics of the circuit components for the two measured values of light are not exactly identical with each other, predetermined correct shutter control characteristics can be obtained through the provision of voltage control means for trigger levels, by which arrangement, marked improvement is achieved from the view point of mass production.

9 Claims, 5 Drawing Figures

AUTOMATIC EXPOSURE CONTROL CIRCUIT FOR A SINGLE LENS REFLEX CAMERA OF TTL LIGHT MEASURING TYPE

The present invention relates to a camera, and more particularly to an automatic exposure control circuit for a single lens reflex camera of the TTL light measuring type wherein automatic exposure is available by light passing through the objective lens.

Commonly, in a conventional single lens reflex camera having automatic exposure controlled by TTL light measuring means as described above, it is a general practice that the light passing through the objective lens is reflected by a tiltable reflex mirror directed to the viewfinder for viewing the object to be photographed through an eyepiece of the viewfinder and for simultaneously measuring the light, with the tiltable reflex mirror adapted to tilt upwardly upon depression of the shutter release button, beyond the optical axis for exposing the film to the light entering through the objective lens, and that one or more light receiving elements for light measurement are disposed on the upper portion of the pentaprism or at either side of eyepiece of the viewfinder.

In one prior art circuit of the above described type, for example, in U.S. Pat. No. 3,777,637, the degree of diaphragm aperture opening is automatically determined according to the brightness of the object to be photographed with the exposure time controlled correspondingly to the output of the light receiving element which receives light through the diaphragm aperture determined in the above described manner.

The light measuring system of the above described type, however, has such serious disadvantages that, since the light receiving element placed in the light path of the range finder unavoidably receives not only the light $I_f$ reflected by the object to be photographed and entering through the objective lens, but also light $I_r$ entering through the eyepiece, erroneous exposure corresponding to the light $I_r$ through the eyepiece inevitably results, which erroneous exposure tends to increase to a significantly great extent when the light measuring is carried out with a smaller diaphragm aperture.

Conventionally, one method for eliminating such erroneous exposures has been proposed by U.S. Pat. No. 3,836,921, which method is based on the principle that a first output of the light receiving element before the reflex mirror is tilted, which output is equal to the sum of the light $I_f$ through the objective lens and the light $I_r$ through the eyepiece, is electronically memorized, and a second output of the light receiving element after the mirror is tilted upward, wherein only the eyepiece light $I_r$ enters the light receiving element, is subtracted from the first output for obtaining a correct light measuring value.

Referring to FIG. 1, there is shown a prior art electrical subtraction circuit as described above which is disclosed in said U.S. Pat. No. 3,836,921. In FIG. 1, the memorizing circuit is abbreviated to show only the subtraction circuit in detail with a light receiving element $D_2$ employed exclusively for the eyepiece light $I_r$. A light receiving element $D_1$ is for the reception of the light entering through the objective lens and, in practice, receives both the objective-lens light $I_f$ and the eyepiece light $I_r$. The circuit includes a current source E, and transistors $Q_1$ and $Q_2$ respectively of the NPN and PNP types connected in series with each other and having equal electrical characteristics, with polarities opposite to each other, and with the collector current of each of the transistors $Q_1$ and $Q_2$ being proportional to the reciprocal of the logarithm of the base-emitter voltage thereof. Thus, a voltage proportional to the logarithmic value of the light input intensity is generated across the terminals of the light-receiving elements, so that the collector currents $i_1$ and $i_2$ of the transistors $Q_1$ and $Q_2$ are respectively proportional to the light input intensity to the light-receiving elements $D_1$ and $D_2$. The collectors of the transistors $Q_1$ and $Q_2$ are connected at a common junction to which a conductor of the electrical circuit is connected for the output current $i_3$ to flow therein through an ammeter $A_m$. In FIG. 1, the photoelectric currents in the light receiving elements $D_1$ and $D_2$ can be represented by the following equations:

For the element $D_1$ $i_1 = K(I_f + I_r)$     (1)

For the element $D_2$ $i_2 = K' I_r$     (2)

where K and K' are proportionality constants, and $i_1$ and $i_2$ are photoelectric currents in the element $D_1$ and $D_2$ respectively. In the prior art circuit of FIG. 1, in order to obtain the objective-light $I_f$ from the above equations (b) and (2) on the assumption that the elements $D_1$ and $D_2$ are the same having the relation $K = K'$, the base-emitter voltage vs. the collector current characteristics of the respective transistors $Q_1$ and $Q_2$ must be equal to each other. It inevitably requires a very troublesome procedure, however, although it is not impossible, to select or distinguish transistors of PNP type from those of NPN type in the assembling process of the electrical circuit, and such a procedure is very difficult to put into practice, yielding an unfavorable return from the view point of manufacturing.

In order to overcome such disadvantages, there has conventionally been proposed by U.S. Pat. No. 3,781,119 a circuit in which variable resistors are employed to adjust the voltage gain of the pair of buffer circuits, which prior art circuit, however, is inevitably complicated by employing two variable resistors, so as to compensate for inherent differences in the in characteristics of the circuit components, thus still presenting some problems in mass production and reduction of manufacturing cost of cameras in which such a circuit is incorporated.

Accordingly, an essential object of the present invention is to provide an automatic exposure control circuit for a single lens reflex camera of the TTL light measuring type which is easy to manufacture and suitable for mass production with substantial elimination of the disadvantages inherent in the conventional light measuring circuit.

Another important object of the present invention is to provide an automatic exposure control circuit of the above described type which has a very simple construction and accurate in functioning for advantageously eliminating the influence of light entering through an eyepiece of the camera without requiring any mechanical contrivances.

A further object of the present invention is to provide a camera wherein the above described circuit is advantageously incorporated for the reduction of the manufacturing cost.

According to a preferred embodiment of the present invention, the automatic exposure control circuit for a single lens reflex camera of the TTL light measuring type comprises a first portion for integrating measured values both of light entering the interior of the camera through an objective lens and of light entering the interior of the camera through an eyepiece, a second portion for integrating only the measured value of the eyepiece-entering light, a third portion for adding an adjustable constant voltage to an integrated output of the measured value of the eyepiece-entering light, and a differential switching circuit which has one input terminal thereof impressed with the integrated measured values both of the objective-lens-entering light and of the eyepiece-entering light and which has the other input terminal thereof impressed with the sum of the integrated measured value only of the eyepiece-entering light and said adjustable constant voltage, with said third portion including a variable resistor for trigger level setting of the differential switching circuit and with a sliding contact arm of the variable resistor being movable for setting the trigger level at a predetermined value for cancelling errors due to deviations in characteristics of circuit elements in determining exposure. By the above arrangement, even if the characteristics of the parts in pairs used for the two measured values of the light are not exactly identical, the predetermined shutter control characteristics can be obtained by a single adjustment, which is remarkably advantageous from the view point of production.

Figure 2:
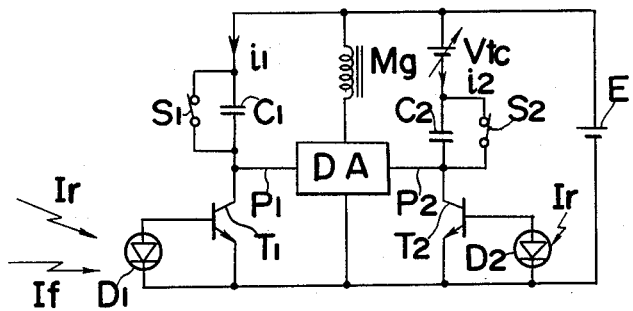
Figure 3:
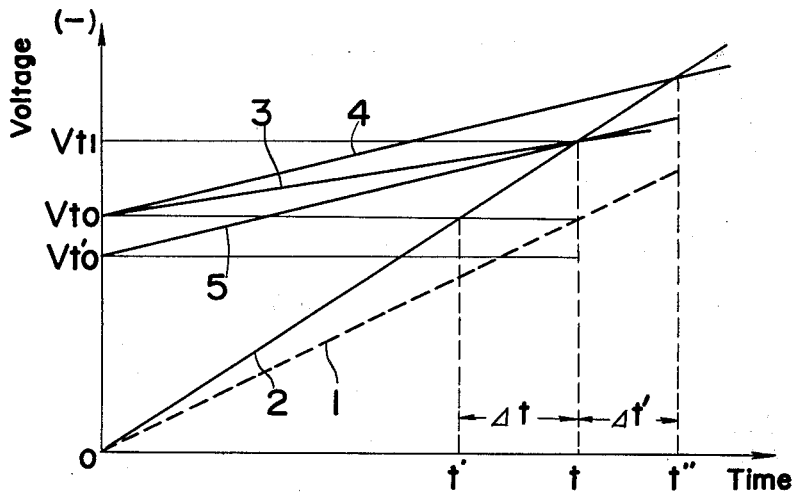
Figure 4:
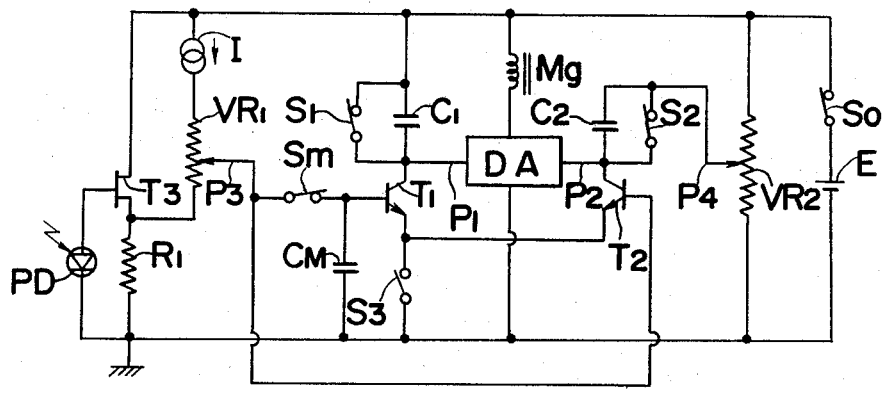
Figure 5:
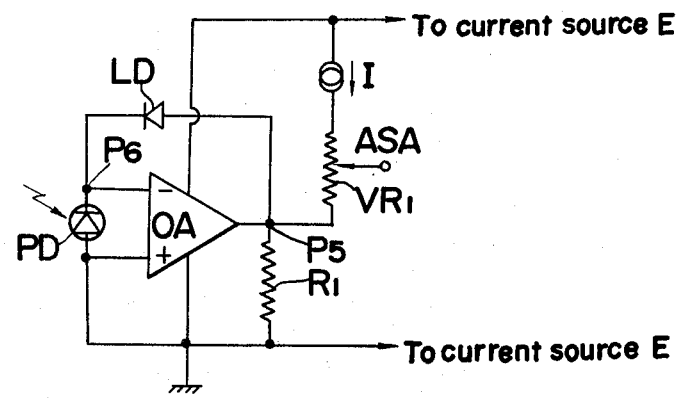

These and other objects and features of the present invention will become apparent from the following description taken in conjunction with the accompanying drawings in which;

FIG. 2 is an electrical circuit diagram illustrating the principle of the light measuring circuitry of the invention, FIG. 3 is a graph showing functions of the circuit of FIG. 2, FIG. 4 is an electrical circuit diagram showing a preferred embodiment of the automatic exposure control circuit of the invention, and FIG. 5 is an electrical circuit diagram showing a modification of the circuit of FIG. 4.

Before the description of the present invention proceeds, it is to be noted that like parts are designated by like numerals or symbols throughout several views of the accompanying drawings.

Referring now to FIG. 2 illustrating the principles of the present invention, the circuit shown includes a current source E, a pair of light-receiving elements $D_1$ and $D_2$, for example, photodiodes as photosensitive means which utilize open-circuit voltage, transistor $T_1$ and $T_2$ in which collector currents proportional to light inputs to the elements $D_1$ and $D_2$ respectively flow, capacitors $C_1$ and $C_2$ for being changed by and integrating the above collector currents and switches $S_1$ and $S_2$ for short-circuiting the capacitors $C_1$ and $C_2$. A differential amplification switching circuit DA with one input terminal $P_1$ thereof connected to the collector of the transistor $T_1$ and other input terminal $P_2$ thereof connected to the collector of the transistor $T_2$, has the output terminal thereof connected to a magnet Mg for controlling the operation of a shutter closing member (not shown) of the camera, and the magnet Mg is adapted to be de-energized to close the shutter of the camera (not shown) when the voltage of the input terminal $P_1$ falls below that of the input terminal $P_2$. An adjustable voltage setting element Vtc is connected in series with the capacitor $C_2$ for setting the voltage at the input terminal $P_2$ of the above switching circuit DA.

By this arrangement, an electric current $i_1$ proportional to the sum of the light intensity of the objective-lens-entering light $I_f$ and the eyepiece-entering light $I_r$ is flowing in the collector of the transistor $T_1$, while a current $i_2$ proportional to the eyepiece-entering light $I_r$ is flowing in the collector of the transistor $T_2$, in which state, when the switches $S_1$ and $S_2$ are open simultaneously, the capacitors $C_1$ and $C_2$ are charged by the currents $i_1$ and $i_2$ respectively, and the voltages at the input terminals $P_1$ and $P_2$ of the switching circuit DA decrease with time. Owing to the relation $i_1 > i_2$ at this time, a state where the voltage level of the input terminal $P_1$ falls below the voltage level of the input terminal $P_2$ is reached as the time proceeds with the shutter consequently being closed. In other words, the voltage $V_1$ at the terminal $P_1$ from the positive side of the current source E is proportional to $I_f + I_r$, and the voltage $V_2$ at the terminal $P_2$ is the sum of a component proportional to $I_r$ and a predetermined component $V_t$, thus closing the shutter upon the occurence of the condition $V_1 \geq V_2$. If the relation is shown by the equations, $$V_1 = A(I_f + I_r)$$

$$V_2 = AI_r + V_t$$

the condition wherein $V_1 \geq V_2$ will be, $$A(I_f + I_r) \geq AI_r + V_t$$

from which the relation $V_t \leq AI_f$ will be derived. Since $AI_f$ is the charging voltage of the capacitor $C_1$ on the supposition that the light-receiving element $D_1$ receives only the objective-lens entering light $I_f$, the circuit of FIG. 2 closes the shutter when the above voltage reaches a predetermined value $V_t$, in which the influence of the eyepiece-entering light $I_r$ is completely eliminated.

It should be noted here, however, that, in the circuit of FIG. 2 described above, each of the light receiving elements $D_1$ and $D_2$ is actually exposed to both the objective-lens-entering light and the eyepiece-entering light, but that, in the light receiving element $D_2$, the output therefrom serves no purposes since the switch $S_2$ is closed so long as the objective-lens-entering light is also incident upon the element $D_2$. In other words, the light receiving element $D_2$ is adapted to receive only the eyepiece-entering light during the time the capacitor $C_2$ is charged by the output through the switch $S_2$ opened simultaneously with the operation of the shutter.

In the circuit of FIG. 2, it is of course possible that the light receiving element $D_2$ be theoretically arranged not to receive the objective-lens entering light by suitable means, depending upon the requirement, through minor alteration in the circuit construction.

Referring now to FIG. 3, a dotted line 1 shows the voltage $V_1$ at the input terminal $P_1$ when the capacitor $C_1$ is charged by the photoelectric current (equivalent to the collector current to the transistor $T_1$) arising only from the objective-lens entering light without containing that from the eyepiece entering light. In the graph of FIG. 3, voltage based on the plus side of the current source E as a standard is plotted toward the minus side thereof on the ordinate axis, while exposure time is plotted on the abscissa axis of the graph. If the trigger level of the terminal $P_2$ of the switching circuit DA in the absence of the eyepiece-entering light is $V_{to}$, the exposure time is to be $t$. A line 2 shows the variations of the level at the terminal $P_1$ wherein the eyepiece-entering light is included. In this case, if the trigger level of the switching circuit DA is $V_{to}$, the exposure time will be $t'$, being shorter than $t$ by $\Delta t$, which $\Delta t$ is the error in exposure. In order to maintain the exposure time at $t$ even at the presence of the eyepiece-entering light, the trigger level must be altered to $V_{t1}$, for which purpose there is provided in FIG. 2 the circuit including the capacitor $C_2$, the transistor $T_2$ and the photodiode $D_2$, etc. In the above circuit of FIG. 2, the capacitor $C_2$ is charged by the current $i_2$ proportional to the eyepiece-entering light $I_r$, with the voltage of the terminal $P_2$ of the switching circuit DA decreasing as shown by a rising line 3 in FIG. 3, and the shutter is closed at the time $t$.

In considering the correct functioning of the above described circuit, the simplest case is to assume that the capacity of the capacitors $C_1$ and $C_2$ are identical with each other, and that the characteristics of the transistors $T_1$ and $T_2$ are the same, and the light-receiving element $D_1$ can be made exactly the same as the element $D_2$ in the circuit construction. It is extemely difficult, however, to make the capacity of the capacitors $C_1$ and $C_2$ and the characteristics of the transistors $T_1$ and $T_2$ perfectly uniform and all these deviations of the capacity and characteristics appear in the functioning circuit as variations in the gradient of the line 3 in FIG. 3. On the supposition that a line 4 having different gradient from the line 3 is obtained as the voltage variations at the input terminal $P_2$ of the switching circuit DA due to the derivations as described above, if the voltage predetermined by the voltage setting element $V_{tc}$ for the input terminal $P_2$ remains $V_{to}$, the exposure time is made longer than $t$ by $\Delta t'$, which is the error resulting from the deviations in the characteristics of the above described parts, and can be advantageously cancelled by changing the voltage to be present from $V_{to}$ to $V_{to}'$ in advance by the voltage setting element. By this adjustment, the voltage level at the input terminal $P_2$ varies along the line 5 of FIG. 3, making it possible to obtain correct exposure time.

Referring now to FIG. 4, there is shown an automatic exposure control circuit according to one embodiment of the present invention, which includes a current source E, a photodiode PD adapted to serve a double function; that of both the light-receiving elements $D_1$ and $D_2$ of FIG. 2. The principle for using the photodiode PD for the combined purpose is that the information $I_f + I_r$ is memorized in a capacitor CM for using the same for the output of the element $D_1$ of the FIG. 2, and since only the eyepiece-entering light $I_r$ is received by the photodiode PD without the influence of the objective-lens entering light after the reflex mirror has been tilted upward, the photodiode PD in this case functions as the element $D_2$ of FIG. 2. A field effect transistor $T_3$ connected at the gate thereof to the photodiode PD has its source side connected to an output resistor $R_1$ for taking out the output voltage of the photodiode PD, which is proportional to the logarithm of the incident light, as a source follower. A constant-current source I connected in series with a variable resistor $VR_1$ which is in turn connected in parallel with the field effect transistor $T_3$ are for setting information for sensitivity of the film and the degree of diaphragm stopping-down in light measuring at fully opened aperture. The variable resistor $VR_1$ has a linear characteristic with a sliding contact arm $P_3$ thereof connected to bases of the transistors $T_1$ and $T_2$ and adapted to slide to alter the voltage by a predetermined degree when the film sensitivity is varied, for example, by one EV. A switch Sm adapted to be opened immediately before the reflex mirror begins to tilt is connected between the sliding contact arm $P_3$ of the variable resistor $VR_1$ and one terminal of the capacitor CM, which capacitor CM is to be charged for memorizing the output at the sliding contact arm $P_3$ before the switch Sm is opened. Although the circuit in FIG. 4 including the capacitors $C_1$ and $C_2$, the transistors $T_1$ and $T_2$, the switches $S_1$ and $S_2$, the differential amplification switching circuit DA and the magnet Mg is similar to that of FIG. 2, since a switch $S_3$ adapted to be closed simultaneously with starting of exposure is connected to a common junction of the emitter side of the transistors $T_1$ and $T_2$ in the circuit of FIG. 4, the switches $S_1$ and $S_2$ fully meet the purpose if they are opened before the starting of exposure. A variable resistor $VR_2$ connected in parallel with the current source E with a sliding contact arm $P_4$ thereof connected to the terminal $P_2$ of the differential amplification circuit DA through the capacitor $C_2$ is for trigger level setting of the switching circuit DA and for circuit adjustment, and is equivalent to the adjustable voltage setting element $V_{tc}$ of FIG. 2. It is possible to move the voltage $V_{to}$ to $V_{to}'$ in FIG. 3 by sliding the sliding contact arm $P_4$ of the variable resistor $VR_2$. In the circuit construction of FIG. 4, the input to the transistors $T_1$ and $T_2$ is the logarithmic sum of information of light, film sensitivity and degree of stopping-down the diaphragm by the variable resistor $VR_1$, the procedure for obtaining the sum being multiplication instead of addition by the inverting action at the transistors $T_1$ and $T_2$ etc. Additionally, in the region wherein the brightness of the object to be photographed can be measured, constant current flowing in the variable resistor $VR_1$ is set to be smaller than the drain current of the field effect transistor $T_3$.

With a camera (not shown) equipped with the circuit of FIG. 4 as described above, in the light measuring condition wherein the film has been wound up ready for shooting, a power switch $S_o$ connected in series with the current source E is closed together with the switches $S_1$, $S_2$ and $S_m$, while the switch $S_3$ is opened. When the shutter release button is depressed for starting shooting, the switch $S_m$ opens before the reflex mirror begins to move with the switches $S_1$ and $S_2$ subsequently being opened, and the switch $S_3$ is closed at the same time as the shutter begins to open. Upon closure of the switch $S_3$, the capacitors $C_1$ and $C_2$ are changed through the transistors $T_1$ and $T_2$ as described in the circuit of FIG. 2 with the switching circuit DA inverted after a predetermined period of time for closing the shutter.

It should be noted here that in the circuit of FIG. 4 described above errors arising from the characteristic deviations of parts such as the capacitors $C_1$ and $C_2$, and the transistors $T_1$ and $T_2$ are advantageously cancelled by adjusting the sliding contact arm $P_4$ of the variable resistor $VR_2$.

It should also be noted that in the circuit of FIG. 4, information other than brightness, such as film sensitivity etc., is taken into account, and if, for example, the film sensitivity is doubled, the lines 2 and 5 in FIG. 3 have the gradient thereof also doubled so as to include such additional information, so that the exposure time equals $t/2$, even if the voltage to be preset at the terminal $P_2$ of the switching circuit DA remains the same $V_{to}'$.

Referring to FIG. 5, there is shown a modification of the circuit of FIG. 4. In this modification, a photodiode PD used is a short-circuit current type with said photodiode PD connected between two differential input terminals of a differential amplification circuit OA. A diode LD for logarithmic transformation is inserted in a feed-back path of the differential amplification circuit OA, and logarithmically transformed output corresponding to the amount of light entering the photodiode PD is obtained across the resistor $R_1'$. Since the rest of the circuit construction is similar to that in the circuit of FIG. 4, the description thereof is omitted for brevity.

It is to be noted that, in the automatic exposure control circuits of the invention, the compensation at the trigger level can be regarded as one wherein the errors in the light measuring circuit are corrected in the exposure control system in the exposure control device including the light measuring circuit.

As is clear from the above description, in the automatic exposure control circuit according to the present invention, the difference of the two measured values of light entering the objective lens and the eyepiece is obtained by integrating each of the measured light values with the effect due to deviations in characteristics of the circuit components reduced to the gradient difference of each integrated value variations, and with the voltage adjusting means for the trigger level provided to enable the gradient of the line 4 to move in a direction parallel therewith to the position of the line 5 of FIG. 3, so that predetermined shutter control characteristics are available by a single adjustment even if each pair of parts used for the two measured values are not exactly identical with each other, which arrangements are remarkably advantageous from the manufacturing point of view, contributing much to mass production of cameras with a high light measuring accuracy.

Although the present invention has been fully described by way of example with reference to the attached drawings, it is to be noted that various changes and modifications are apparent to those skilled in the art. Therefore, unless otherwise such changes and modifications depart from the scope of the present invention, they should be construed as included therein.

What is claimed is:

1. An automatic exposure control circuit for a single lens reflex camera of the TTL light measuring type having an objective lens through which light from an object to be photographed enters the interior of the camera and an eyepiece through which light also enters the interior of the camera, which automatic exposure control circuit comprises:
    a differential switching circuit which has a first input terminal and a second input terminal and for controlling the operation of a camera shutter in response to the output thereof;
    a light receiving means for measuring the light entering the camera through the objective lens and he light entering through the eyepiece;
    a first portion coupled to said light receiving means for receiving from said light receiving means the measured values of both the light entering through the objective lens and light entering through the eyepiece, said first portion having only a single first transistor the base of which is coupled to said light receiving means, the collector of which is connected to said first input terminal of said differential switching circuit and in which collector current proportional to said light entering through the objective lens and eyepiece flows, and further having a first capacitor connected to said first input terminal of said differential switching circuit and the collector of said first transistor for integrating said collector current, and first switch means connected in parallel with said first capacitor for short circuiting said first capacitor;
    a second portion coupled to said light receiving means for receiving from said light receiving means the measured value of the light entering through the eyepiece, said second portion having only a single second transistor of the same type as said first transistor the base of which is coupled to said light receiving means and the collector of which is connected to said second input terminal of said differential switching circuit and in which collector current proportional to said light entering only through the eyepiece flows, and further having a second capacitor connected to said second terminal of said differential switching circuit and the collector of said second transistor for integrating said collector current, and second switch means connected in parallel with said second capacitor for short circuiting said second capacitor, the emitter of said second transistor being coupled to the emitter of said first transistor; and
    a current source coupled to said differential switching circuit, said light receiving means and said first and second portions.

2. An automatic exposure control circuit as claimed in claim 1 in which said light receiving means comprises a first light receiving element for receiving the light entering both said lens and said eyepiece, and a second light receiving element for receiving the light entering only the eyepiece, said first transistor being coupled to said first light receiving element and said second transistor being coupled to said second light receiving element.

3. An automatic exposure control circuit as claimed in claim 1 further comprising voltage adjusting means coupled to said second portion for adjusting the trigger level setting of said differential switching circuit.

4. An automatic exposure control circuit as claimed in claim 3 in which said voltage adjusting means is a first variable resistor coupled to said second capacitor.

5. An automatic exposure control circuit as claimed in claim 1 in whiich said light receiving means comprises a single light receiving element for receiving the light entering both said lens and said eyepiece, and further comprises storage means coupled to said light receiving element for storing a charge corresponding to the light entering both said lens and said eyepiece, and switch means between said storage means and and said light receiving element for disconnecting said storage means and said light receiving element just before the reflex mirror of said camera moves from its viewing position, said first transistor being coupled to said storage means and said second transistor being coupled to said light receiving element.

6. An automatic exposure control circuit as claimed in claim 5, wherein said light receiving means further includes a field effect transistor having the gate thereof connected to said light receiving element, the drain thereof being connected to said current source through power source switch means, and the source thereof being connected to said switch means for taking out an output voltage of said light measuring means which is proportional to the logarithm of light incident upon said light measuring means as a source follower.

7. An automatic exposure control circuit as claimed in claim 6, wherein said exposure control circuit further includes a constant current source and a second variable resistor connected in series with each other, and connected in parallel with said field effect transistor, said second variable resistor having a sliding contact arm connected to the base of said second transistor and to said switch means, said constant current source and said second variable resistor being series connected with each other serving for setting information of film sensitivity and degree of diaphragm stopping-down in light measuring at fully opened aperture.

8. An automatic exposure control circuit as claimed in claim 5, wherein said light receiving means is a photodiode of the short-circuit current type, a differential amplification circuit having two differential input terminals between which said photo-diode is connected, a diode for logarithmic transformation connected in a feed-back circuit with said differential circuit, and the output of said differential amplification circuit being coupled to said first and second transistors.

9. An automatic exposure control circuit as claimed in claim 5, further comprising means for synchronously initiating the integrating operation of said first and second portions of the control circuit in response to actuation of the shutter of the camera.

* * * * *